US008393645B2

(12) United States Patent
Wiseman et al.

(10) Patent No.: US 8,393,645 B2
(45) Date of Patent: Mar. 12, 2013

(54) DEVICES FOR ADJUSTING TENSION IN SEAT BELTS AND OTHER RESTRAINT SYSTEM WEBS, AND ASSOCIATED METHODS

(75) Inventors: Michael A. Wiseman, Elkhart, IN (US); Robert Desmarais, Elkhart, IN (US)

(73) Assignee: AmSafe Commercial Products, Inc., Elkhart, IN (US)

( * ) Notice: Subject to any disclaimer, the term of this patent is extended or adjusted under 35 U.S.C. 154(b) by 99 days.

(21) Appl. No.: 12/917,898

(22) Filed: Nov. 2, 2010

(65) Prior Publication Data

US 2011/0140405 A1 Jun. 16, 2011

Related U.S. Application Data

(60) Provisional application No. 61/257,398, filed on Nov. 2, 2009.

(51) Int. Cl.
   *B60R 22/00* (2006.01)
(52) U.S. Cl. ............... 280/808; 24/171; 280/807
(58) Field of Classification Search .............. 280/807, 280/808; 297/474, 475, 483; 24/168, 171, 24/194
   See application file for complete search history.

(56) References Cited

U.S. PATENT DOCUMENTS

| 906,045 | A | 12/1908 | Martin |
|---|---|---|---|
| 1,079,080 | A | 11/1913 | Ward |
| 1,438,898 | A | 12/1922 | Carpmill |
| 2,538,641 | A | 1/1951 | Elsner |
| 2,549,841 | A | 4/1951 | Morrow et al. |
| 2,639,852 | A | 5/1953 | Sanders et al. |
| 2,641,813 | A | 6/1953 | Loxham |
| 2,710,999 | A | 6/1955 | Davis |
| 2,763,451 | A | 9/1956 | Moran |
| 2,803,864 | A | 8/1957 | Bishaf |
| 2,846,745 | A | 8/1958 | Lathrop |
| 2,869,200 | A | 1/1959 | Phillips et al. |
| 2,876,516 | A | 3/1959 | Cummings |
| 2,892,232 | A | 6/1959 | Quilter |
| 2,893,088 | A | 7/1959 | Harper et al. |
| 2,899,732 | A | 8/1959 | Cushman |
| 2,901,794 | A | 9/1959 | Prete, Jr. |
| 2,938,254 | A | 5/1960 | Gaylord |
| 2,964,815 | A | 12/1960 | Sereno |

(Continued)

FOREIGN PATENT DOCUMENTS

| CA | 2038505 A1 | 9/1991 |
|---|---|---|
| CA | 2091526 A1 | 10/1993 |

(Continued)

OTHER PUBLICATIONS

U.S. Appl. No. 29/297,210, filed Nov. 6, 2007, Toltsman.

(Continued)

*Primary Examiner* — Paul N Dickson
*Assistant Examiner* — Laura Freedman
(74) *Attorney, Agent, or Firm* — Perkins Coie LLP

(57) ABSTRACT

Devices that can be releasably attached to seat belts and other restraint system webs to adjust the operational tension in the webs are described herein. In one embodiment, a seat belt web passes through a clamping device that includes a button movably coupled to a housing. In this embodiment, manual operation of the button in a first direction causes the device to clamp onto the adjacent portion of the seat belt web, thereby preventing the portion of web from being pulled through a web guide by a retractor. Manual operation of the button in a second direction causes the device to release the web.

12 Claims, 7 Drawing Sheets

U.S. PATENT DOCUMENTS

| | | | |
|---|---|---|---|
| 2,965,942 A | 12/1960 | Carter | |
| 3,029,487 A | 4/1962 | Asai | |
| 3,084,411 A | 4/1963 | Lindblad | |
| 3,091,010 A | 5/1963 | Davis | |
| 3,104,440 A | 9/1963 | Davis | |
| 3,110,071 A | 11/1963 | Higuchi | |
| 3,118,208 A | 1/1964 | Wexler | |
| 3,137,907 A | 6/1964 | Unai | |
| D198,566 S | 7/1964 | Holmberg et al. | |
| 3,142,103 A | 7/1964 | Lindblad | |
| 3,145,442 A | 8/1964 | Brown | |
| 3,165,805 A | 1/1965 | Lower | |
| 3,179,992 A | 4/1965 | Murphy, Sr. | |
| 3,183,568 A | 5/1965 | Gaylord | |
| 3,189,963 A * | 6/1965 | Warner et al. | 24/196 |
| 3,218,685 A | 11/1965 | Atumi | |
| 3,226,791 A | 1/1966 | Carter | |
| 3,233,941 A | 2/1966 | Selzer | |
| 3,256,576 A | 6/1966 | Klove, Jr. et al. | |
| 3,262,169 A | 7/1966 | Jantzen | |
| 3,287,062 A | 11/1966 | Board | |
| 3,289,261 A | 12/1966 | Davis | |
| 3,293,713 A * | 12/1966 | Gaylord | 24/196 |
| 3,312,502 A | 4/1967 | Coe | |
| 3,369,842 A | 2/1968 | Adams et al. | |
| 3,414,947 A | 12/1968 | Holmberg et al. | |
| 3,451,720 A | 6/1969 | Makinen | |
| 3,491,414 A | 1/1970 | Stoffel | |
| 3,505,711 A | 4/1970 | Carter | |
| 3,523,342 A | 8/1970 | Spires | |
| D218,589 S | 9/1970 | Lorhr et al. | |
| 3,564,672 A | 2/1971 | McIntyre | |
| 3,576,056 A | 4/1971 | Barcus | |
| 3,591,900 A * | 7/1971 | Brown | 24/196 |
| 3,605,207 A | 9/1971 | Glauser et al. | |
| 3,605,210 A | 9/1971 | Lohr | |
| 3,631,571 A | 1/1972 | Stoffel | |
| 3,639,948 A | 2/1972 | Sherman | |
| 3,644,967 A | 2/1972 | Romanzi, Jr. et al. | |
| 3,648,333 A | 3/1972 | Stoffel | |
| 3,658,281 A | 4/1972 | Gaylord | |
| 3,673,645 A | 7/1972 | Burleigh et al. | |
| 3,678,542 A | 7/1972 | Prete, Jr. | |
| 3,695,696 A | 10/1972 | Lohr et al. | |
| 3,714,684 A | 2/1973 | Gley | |
| 3,744,102 A | 7/1973 | Gaylord | |
| 3,744,103 A | 7/1973 | Gaylord | |
| 3,760,464 A | 9/1973 | Higuchi | |
| 3,766,611 A | 10/1973 | Gaylord | |
| 3,775,813 A | 12/1973 | Higuchi | |
| 3,825,979 A | 7/1974 | Jakob | |
| 3,856,351 A * | 12/1974 | Garvey | 297/478 |
| 3,879,810 A | 4/1975 | Prete, Jr. et al. | |
| 3,898,715 A * | 8/1975 | Balder | 24/196 |
| 3,935,618 A | 2/1976 | Fohl et al. | |
| 3,964,138 A | 6/1976 | Gaylord | |
| 3,986,234 A | 10/1976 | Frost et al. | |
| 3,995,885 A * | 12/1976 | Plesniarski | 297/474 |
| 4,018,399 A | 4/1977 | Rex | |
| 4,051,743 A | 10/1977 | Gaylord | |
| 4,095,313 A | 6/1978 | Piljay et al. | |
| D248,618 S | 7/1978 | Anthony | |
| 4,100,657 A | 7/1978 | Minolla et al. | |
| 4,118,833 A | 10/1978 | Knox et al. | |
| 4,128,924 A | 12/1978 | Happel et al. | |
| 4,136,422 A * | 1/1979 | Ivanov et al. | 24/170 |
| 4,148,224 A * | 4/1979 | Craig | 24/134 KB |
| 4,181,832 A | 1/1980 | Ueda et al. | |
| 4,184,234 A | 1/1980 | Anthony et al. | |
| 4,185,363 A | 1/1980 | David | |
| 4,196,500 A | 4/1980 | Happel et al. | |
| 4,220,294 A | 9/1980 | DiPaola | |
| 4,228,567 A | 10/1980 | Ikesue et al. | |
| 4,239,260 A | 12/1980 | Hollowell | |
| 4,253,623 A | 3/1981 | Steger et al. | |
| 4,262,396 A | 4/1981 | Koike | |
| 4,273,301 A | 6/1981 | Frankila | |
| 4,302,049 A | 11/1981 | Simpson | |
| 4,317,263 A | 3/1982 | Fohl et al. | |
| 4,321,734 A | 3/1982 | Gandelman | |
| 4,334,341 A | 6/1982 | Krautz et al. | |
| 4,336,636 A | 6/1982 | Ishiguro et al. | |
| 4,366,604 A | 1/1983 | Anthony et al. | |
| 4,408,374 A | 10/1983 | Fohl et al. | |
| 4,419,874 A | 12/1983 | Brentini et al. | |
| 4,425,688 A | 1/1984 | Anthony et al. | |
| 4,457,052 A | 7/1984 | Hauber | |
| 4,487,454 A | 12/1984 | Biller | |
| 4,491,343 A * | 1/1985 | Fohl | 280/801.1 |
| 4,525,901 A | 7/1985 | Krauss | |
| 4,545,097 A | 10/1985 | Wier et al. | |
| 4,549,769 A * | 10/1985 | Pilarski | 297/483 |
| 4,569,535 A | 2/1986 | Haglund et al. | |
| D285,383 S | 9/1986 | Anthony | |
| 4,617,705 A | 10/1986 | Anthony et al. | |
| 4,637,102 A | 1/1987 | Teder et al. | |
| 4,638,533 A | 1/1987 | Gloomis et al. | |
| 4,640,550 A | 2/1987 | Hakansson et al. | |
| 4,644,618 A | 2/1987 | Holmberg et al. | |
| 4,646,400 A | 3/1987 | Tanaka et al. | |
| 4,648,483 A | 3/1987 | Skyba | |
| 4,650,214 A * | 3/1987 | Higbee | 280/808 |
| 4,651,946 A | 3/1987 | Anthony et al. | |
| 4,656,700 A | 4/1987 | Tanaka et al. | |
| 4,660,889 A | 4/1987 | Anthony et al. | |
| 4,679,852 A | 7/1987 | Anthony et al. | |
| 4,682,791 A | 7/1987 | Ernst et al. | |
| 4,685,176 A | 8/1987 | Burnside et al. | |
| 4,692,970 A | 9/1987 | Anthony et al. | |
| 4,711,003 A | 12/1987 | Gelula | |
| 4,716,630 A | 1/1988 | Skyba | |
| 4,720,148 A | 1/1988 | Anthony et al. | |
| 4,726,625 A * | 2/1988 | Bougher | 297/483 |
| 4,727,628 A | 3/1988 | Rudholm et al. | |
| 4,733,444 A | 3/1988 | Takada | |
| 4,738,485 A | 4/1988 | Rumpf | |
| 4,742,604 A | 5/1988 | Mazelsky | |
| D296,678 S | 7/1988 | Lortz et al. | |
| 4,757,579 A | 7/1988 | Nishino et al. | |
| 4,758,048 A | 7/1988 | Shuman | |
| 4,766,654 A | 8/1988 | Sugimoto | |
| 4,790,597 A | 12/1988 | Bauer et al. | |
| 4,809,409 A | 3/1989 | Van Riesen et al. | |
| 4,832,410 A | 5/1989 | Bougher | |
| 4,843,688 A | 7/1989 | Ikeda et al. | |
| 4,854,608 A | 8/1989 | Barral et al. | |
| D303,232 S | 9/1989 | Lortz et al. | |
| 4,876,770 A | 10/1989 | Bougher | |
| 4,876,772 A | 10/1989 | Anthony et al. | |
| 4,884,652 A | 12/1989 | Vollmer | |
| 4,911,377 A | 3/1990 | Lortz et al. | |
| 4,919,484 A | 4/1990 | Bougher et al. | |
| 4,934,030 A | 6/1990 | Spinosa et al. | |
| 4,940,254 A | 7/1990 | Ueno et al. | |
| 4,942,649 A | 7/1990 | Anthony et al. | |
| 4,995,640 A | 2/1991 | Saito et al. | |
| 5,015,010 A | 5/1991 | Homeier et al. | |
| 5,023,981 A | 6/1991 | Anthony et al. | |
| 5,026,093 A | 6/1991 | Nishikaji | |
| 5,029,369 A | 7/1991 | Oberhardt et al. | |
| 5,031,962 A | 7/1991 | Lee | |
| 5,038,446 A | 8/1991 | Anthony et al. | |
| 5,039,169 A | 8/1991 | Bougher et al. | |
| 5,054,815 A * | 10/1991 | Gavagan | 280/808 |
| 5,067,212 A | 11/1991 | Ellis | |
| 5,074,011 A | 12/1991 | Carlson | |
| 5,084,946 A | 2/1992 | Lee | |
| 5,088,160 A | 2/1992 | Warrick | |
| 5,088,163 A | 2/1992 | van Riesen et al. | |
| 5,097,572 A | 3/1992 | Warrick | |
| D327,455 S | 6/1992 | Blair | |
| 5,119,532 A | 6/1992 | Tanaka et al. | |
| 5,123,147 A | 6/1992 | Blair | |
| 5,142,748 A | 9/1992 | Anthony et al. | |
| 5,159,732 A | 11/1992 | Burke et al. | |
| 5,160,186 A | 11/1992 | Lee | |
| 5,170,539 A | 12/1992 | Lundstedt et al. | |

| | | |
|---|---|---|
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth et al. |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A * | 2/1994 | Forster ............ 280/808 |
| 5,286,090 A | 2/1994 | Templin et al. |
| 5,292,181 A | 3/1994 | Dybro |
| 5,308,148 A | 5/1994 | Peterson et al. |
| 5,311,653 A | 5/1994 | Merrick |
| 5,350,195 A * | 9/1994 | Brown ............ 280/806 |
| 5,350,196 A * | 9/1994 | Atkins ............ 280/808 |
| 5,369,855 A | 12/1994 | Tokugawa et al. |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,403,038 A | 4/1995 | McFalls |
| 5,406,681 A | 4/1995 | Olson |
| 5,411,292 A * | 5/1995 | Collins et al. ............ 280/806 |
| D359,710 S | 6/1995 | Chinni et al. |
| 5,432,987 A | 7/1995 | Schroth |
| 5,443,302 A | 8/1995 | Dybro |
| 5,451,094 A | 9/1995 | Templin et al. |
| D364,124 S | 11/1995 | Lortz et al. |
| 5,471,714 A | 12/1995 | Olson et al. |
| 5,495,646 A * | 3/1996 | Scrutchfield et al. ............ 24/500 |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,560,565 A | 10/1996 | Merrick et al. |
| 5,561,891 A | 10/1996 | Hsieh et al. |
| 5,566,431 A | 10/1996 | Haglund |
| 5,568,676 A | 10/1996 | Freeman |
| 5,570,933 A | 11/1996 | Rouhana et al. |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,653,003 A * | 8/1997 | Freeman ............ 24/543 |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,722,689 A * | 3/1998 | Chen et al. ............ 280/805 |
| 5,743,597 A | 4/1998 | Jessup et al. |
| 5,774,947 A | 7/1998 | Anscher |
| 5,779,319 A | 7/1998 | Merrick |
| D397,063 S | 8/1998 | Woellert et al. |
| 5,788,282 A | 8/1998 | Lewis |
| 5,794,878 A | 8/1998 | Carpenter et al. |
| 5,813,097 A | 9/1998 | Woellert et al. |
| 5,839,793 A | 11/1998 | Merrick et al. |
| 5,857,247 A | 1/1999 | Warrick et al. |
| 5,873,599 A | 2/1999 | Bauer et al. |
| 5,873,635 A | 2/1999 | Merrick |
| 5,882,084 A | 3/1999 | Verellen et al. |
| D407,667 S | 4/1999 | Homeier |
| 5,908,223 A | 6/1999 | Miller |
| 5,915,630 A | 6/1999 | Step |
| D412,298 S | 7/1999 | Rogers et al. |
| 5,934,760 A | 8/1999 | Schroth et al. |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,056,320 A | 5/2000 | Khalifa et al. |
| 6,065,367 A | 5/2000 | Schroth et al. |
| 6,065,777 A | 5/2000 | Merrick |
| 6,123,388 A | 9/2000 | Vits et al. |
| 6,182,783 B1 | 2/2001 | Bayley |
| RE37,123 E | 4/2001 | Templin et al. |
| 6,230,370 B1 | 5/2001 | Nelsen |
| 6,260,884 B1 * | 7/2001 | Bittner et al. ............ 280/806 |
| 6,295,700 B1 | 10/2001 | Plzak |
| 6,309,024 B1 | 10/2001 | Busch |
| 6,312,015 B1 | 11/2001 | Merrick et al. |
| 6,315,232 B1 | 11/2001 | Merrick |
| 6,322,140 B1 | 11/2001 | Jessup et al. |
| 6,328,379 B1 | 12/2001 | Merrick et al. |
| 6,343,841 B1 | 2/2002 | Gregg et al. |
| 6,357,790 B1 | 3/2002 | Swann et al. |
| 6,363,591 B1 | 4/2002 | Bell et al. |
| 6,367,882 B1 | 4/2002 | Van Druff et al. |
| 6,374,168 B1 | 4/2002 | Fujii |
| 6,400,145 B1 | 6/2002 | Chamings et al. |
| 6,412,863 B1 | 7/2002 | Merrick et al. |
| 6,418,596 B1 | 7/2002 | Haas |
| 6,425,632 B1 | 7/2002 | Anthony et al. |
| 6,442,807 B1 | 9/2002 | Adkisson |
| 6,446,272 B1 | 9/2002 | Lee et al. |
| 6,463,638 B1 | 10/2002 | Pontaoe |
| 6,467,849 B1 | 10/2002 | Deptolla et al. |
| 6,485,057 B1 | 11/2002 | Midorikawa et al. |
| 6,485,098 B1 | 11/2002 | Vits et al. |
| 6,508,515 B2 | 1/2003 | Vits et al. |
| 6,513,208 B1 | 2/2003 | Sack et al. |
| 6,520,392 B2 | 2/2003 | Thibodeau et al. |
| 6,543,101 B2 | 4/2003 | Sack et al. |
| 6,547,273 B2 | 4/2003 | Grace et al. |
| 6,560,825 B2 | 5/2003 | Maciejczyk et al. |
| 6,566,869 B2 | 5/2003 | Chamings et al. |
| 6,588,077 B2 | 7/2003 | Katsuyama et al. |
| 6,592,149 B2 * | 7/2003 | Sessoms ............ 280/801.1 |
| 6,619,753 B2 | 9/2003 | Takayama |
| 6,631,926 B2 * | 10/2003 | Merrick et al. ............ 280/804 |
| 6,665,912 B2 | 12/2003 | Turner et al. |
| 6,694,577 B2 | 2/2004 | Di Perrero et al. |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,769,157 B1 | 8/2004 | Meal |
| 6,786,294 B2 | 9/2004 | Specht et al. |
| 6,786,510 B2 | 9/2004 | Roychoudhury et al. |
| 6,786,511 B2 | 9/2004 | Heckmayr et al. |
| 6,796,007 B1 | 9/2004 | Anscher |
| 6,802,470 B2 | 10/2004 | Smithson et al. |
| 6,820,310 B2 | 11/2004 | Woodard et al. |
| 6,834,822 B2 | 12/2004 | Koning et al. |
| 6,836,754 B2 | 12/2004 | Cooper |
| 6,840,544 B2 | 1/2005 | Prentkowski |
| 6,851,160 B2 | 2/2005 | Carver |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kempf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,935,701 B1 | 8/2005 | Arnold et al. |

| | | |
|---|---|---|
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,479 B2 | 2/2006 | Desmarais et al. |
| 7,010,836 B2 * | 3/2006 | Acton et al. ............ 24/265 BC |
| D519,406 S | 4/2006 | Merrill et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,077,475 B2 | 7/2006 | Boyle |
| 7,080,856 B2 | 7/2006 | Desmarais et al. |
| 7,100,991 B2 | 9/2006 | Schroth et al. |
| 7,108,114 B2 | 9/2006 | Mori et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,251 B2 | 12/2006 | Bell et al. |
| D535,214 S | 1/2007 | Kolasa |
| 7,159,285 B2 | 1/2007 | Karlsson |
| 7,180,258 B2 | 2/2007 | Specht et al. |
| 7,182,370 B2 | 2/2007 | Arnold |
| 7,210,707 B2 | 5/2007 | Schroth et al. |
| 7,219,929 B2 | 5/2007 | Bell et al. |
| 7,232,154 B2 | 6/2007 | Desmarais et al. |
| 7,237,741 B2 | 7/2007 | Specht |
| 7,240,405 B2 * | 7/2007 | Webber et al. ............ 24/171 |
| 7,240,924 B2 | 7/2007 | Kohlndorfer et al. |
| 7,246,854 B2 | 7/2007 | Dingman et al. |
| 7,263,750 B2 | 9/2007 | Keene et al. |
| 7,278,684 B2 | 10/2007 | Boyle |
| D555,358 S | 11/2007 | King |
| 7,300,013 B2 | 11/2007 | Morgan et al. |
| 7,341,216 B2 | 3/2008 | Heckmayr et al. |
| 7,360,287 B2 | 4/2008 | Cerruti et al. |
| 7,367,590 B2 | 5/2008 | Koning et al. |
| 7,377,464 B2 | 5/2008 | Morgan |
| 7,384,014 B2 | 6/2008 | Ver Hoven et al. |
| 7,395,585 B2 | 7/2008 | Longley et al. |
| 7,404,239 B1 | 7/2008 | Walton et al. |
| 7,407,193 B2 | 8/2008 | Yamaguchi et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,477,139 B1 * | 1/2009 | Cuevas ............ 340/457.1 |
| 7,481,399 B2 | 1/2009 | Nohren et al. |
| 7,506,413 B2 | 3/2009 | Dingman et al. |
| 7,516,808 B2 | 4/2009 | Tanaka |
| 7,520,036 B1 | 4/2009 | Baldwin et al. |
| D592,543 S | 5/2009 | Kolasa |
| 7,533,902 B2 | 5/2009 | Arnold et al. |
| 7,547,043 B2 | 6/2009 | Kokeguchi et al. |
| 7,614,124 B2 | 11/2009 | Keene et al. |
| 7,631,830 B2 | 12/2009 | Boelstler et al. |
| 7,669,794 B2 | 3/2010 | Boelstler et al. |
| 7,739,019 B2 | 6/2010 | Robert et al. |
| 7,775,557 B2 | 8/2010 | Bostrom et al. |
| RE41,790 E | 10/2010 | Stanley |
| 7,861,341 B2 | 1/2011 | Ayette et al. |
| 7,862,124 B2 | 1/2011 | Dingman |
| D632,611 S | 2/2011 | Buscart |
| D637,518 S | 5/2011 | Chen |
| 8,096,027 B2 | 1/2012 | Jung et al. |
| 2002/0089163 A1 | 7/2002 | Bedewi et al. |
| 2002/0135175 A1 | 9/2002 | Schroth |
| 2003/0027917 A1 | 2/2003 | Namiki et al. |
| 2004/0217583 A1 | 11/2004 | Wang |
| 2005/0017567 A1 | 1/2005 | Sachs et al. |
| 2005/0107932 A1 | 5/2005 | Bolz et al. |
| 2005/0127660 A1 | 6/2005 | Liu |
| 2005/0284977 A1 | 12/2005 | Specht et al. |
| 2006/0075609 A1 | 4/2006 | Dingman et al. |
| 2006/0097095 A1 | 5/2006 | Boast |
| 2006/0237573 A1 | 10/2006 | Boelstler et al. |
| 2006/0243070 A1 | 11/2006 | Van Druff et al. |
| 2006/0267394 A1 | 11/2006 | David et al. |
| 2006/0277727 A1 | 12/2006 | Keene et al. |
| 2007/0241549 A1 | 10/2007 | Boelstler et al. |
| 2007/0257480 A1 | 11/2007 | Van Druff et al. |
| 2008/0018156 A1 | 1/2008 | Hammarskjold et al. |
| 2008/0054615 A1 | 3/2008 | Coultrup |
| 2008/0100051 A1 | 5/2008 | Bell et al. |
| 2008/0100122 A1 | 5/2008 | Bell et al. |
| 2008/0172847 A1 | 7/2008 | Keene et al. |
| 2009/0069983 A1 | 3/2009 | Humbert et al. |
| 2009/0241305 A1 | 10/2009 | Buckingham |
| 2010/0115737 A1 | 5/2010 | Foubert |
| 2010/0125983 A1 | 5/2010 | Keene et al. |
| 2010/0146749 A1 | 6/2010 | Jung |
| 2010/0213753 A1 | 8/2010 | Humbert |
| 2011/0010901 A1 | 1/2011 | Holler |

FOREIGN PATENT DOCUMENTS

| | | |
|---|---|---|
| CA | 2112960 A1 | 7/1994 |
| CA | 2450744 A1 | 2/2003 |
| DE | 4019402 A1 | 12/1991 |
| DE | 4421688 | 12/1995 |
| DE | 69019765 | 2/1996 |
| EP | 26564 A1 * | 4/1981 |
| EP | 0363062 A2 | 4/1990 |
| EP | 0380442 | 8/1990 |
| EP | 0401455 A1 | 12/1990 |
| EP | 0404730 A1 | 12/1990 |
| EP | 0449772 A1 | 10/1991 |
| EP | 0519296 A1 | 12/1992 |
| EP | 0561274 A1 | 9/1993 |
| EP | 0608564 | 8/1994 |
| EP | 1153789 | 11/2001 |
| EP | 1447021 A1 | 8/2004 |
| FR | 1298012 A | 7/1962 |
| GB | 888436 A | 1/1962 |
| GB | 1047761 | 11/1966 |
| GB | 1582973 A | 1/1981 |
| GB | 2055952 A | 3/1981 |
| GB | 2356890 A | 6/2001 |
| JP | 52055120 A * | 5/1977 |
| JP | 63141852 A * | 6/1988 |
| JP | 63247150 A * | 10/1988 |
| JP | 10119611 A | 5/1998 |
| JP | 2001138858 A | 5/2001 |
| WO | WO-8603386 | 6/1986 |
| WO | WO-03009717 A2 | 2/2003 |
| WO | WO-2004004507 A1 | 1/2004 |
| WO | WO-2006041859 A2 | 4/2006 |
| WO | WO-2010/027853 A1 | 3/2010 |

OTHER PUBLICATIONS

Britax, "COMPAQ: Convertible Car Seats." Buckle Image. Accessed Oct. 12, 2010. (2 pages).
Global Seating Systems LLC, "CCOPS," Cobra: Soldier Survival System, 1 page, undated.
Holmbergs, "Art.No. 63-4959-XX and 63-4958-XX GR.1 Buckle, 3/5 point." Accessed Sep. 15, 2010. www.holmbergs.se. (2 pages).
Holmbergs, "Gr. 0+ 3-point buckle with plastic chassi and tongues." Accessed Sep. 15, 2010. www. holmbergs.se. (1 page).
Holmbergs, "Gr. 1 Buckle, Viking." Accessed Sep. 15, 2010. www. holmbergs.se. (1 page).
Holmbergs, "Group 1 Systems." Accessed Sep. 15, 2010. www. holmbergs.se. (1 page).
Holmbergs, "Infant buckle with steel tongues." Accessed Sep. 15, 2010. www.holmbergs.se. (1 page).
Holmbergs, "Infant buckle. 5-point with plastic chassi and plastic tongues." Accessed Sep. 15, 2010. www.holmbergs.se. (1 page).
Novarace, "DL: Group 1 Buckle." Accessed Sep. 15, 2010. www. novarace.com. (1 page).
Novarace, "GT 3: Group 0 Buckle." Accessed Sep. 15, 2010. www. novarace.com (1 page).

Novarace, "GT 5: Group 0 Buckle." Accessed Sep. 15, 2010. www.novarace.com (1 page).

Novarace, "GT: Group 1 Buckle." Accessed Oct. 8, 2010. www.novarace.com. (1 page).

Novarace, "KMA 1: Group 1 Buckle." Accessed Sep. 15, 2010. www.novarace.com. (1 page).

Sabelt Catalog, "SAB104: Standard tongue hole to facilitate webbing insert," p. 23 (1 page).

Sabelt, "Daphne 0: Fiberglass-plastic buckle with metal pin latch." Accessed Sep. 15, 2010. www.sabelt.com (1 page).

Sabelt, "RO1000: Fiberglass-plastic buckle with metal pin latch." Accessed Sep. 15, 2010. www.sabelt.com (1 page).

Sabelt, "SAB004: Fiberglass-plastic buckle with metal pin latch." Accessed Sep. 15, 2010. www.sabelt.com. (1 page).

Sabelt, "SABUSA004: Fiberglass-plastic buckle with metal pin latch." Accessed Sep. 15, 2010. www.sabelt.com. (1 page).

Schroth Safety Products, Installation Instructions, HMMWV Gunner restraint, Single Lower with Swivel—M1151, Revision: A, Jul. 28, 2006, pp. 1-10.

Toltzman, Randall and Shaul, Rich; "Buckle Assembly"; U.S. Appl. No. 29/297,210, filed Nov. 6, 2007.

* cited by examiner

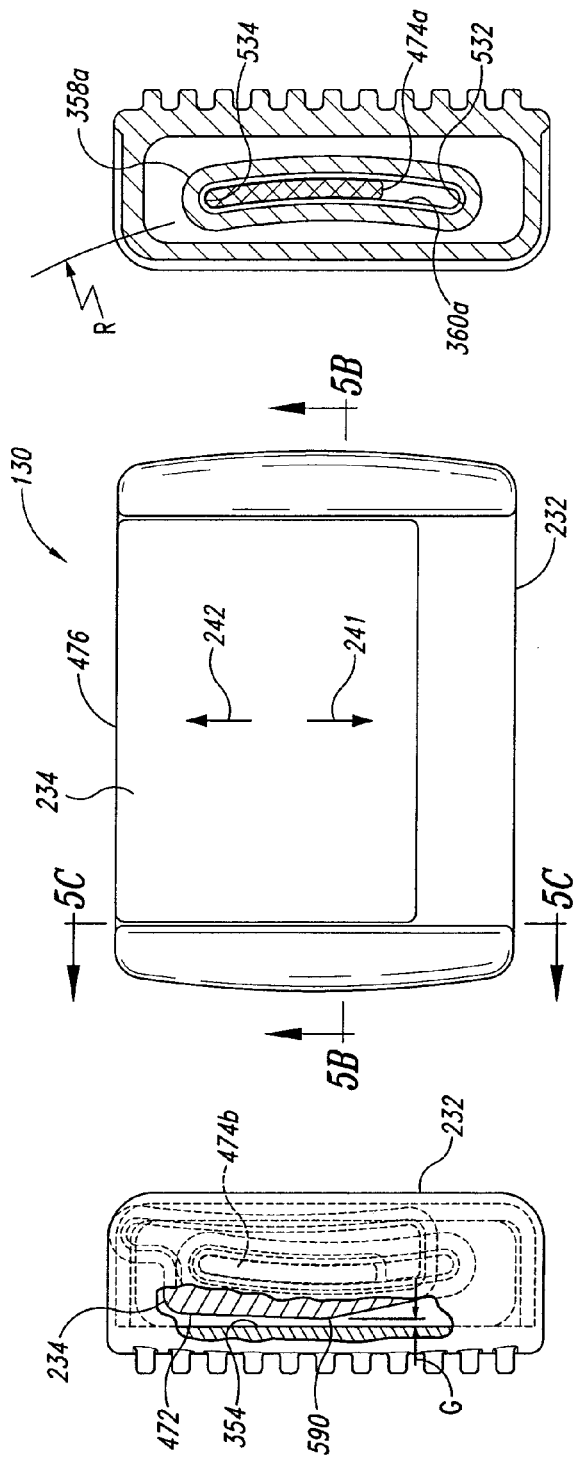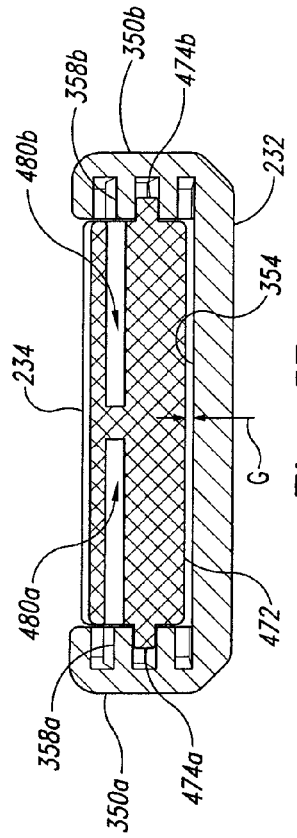

DEVICES FOR ADJUSTING TENSION IN SEAT BELTS AND OTHER RESTRAINT SYSTEM WEBS, AND ASSOCIATED METHODS

CROSS-REFERENCE TO RELATED APPLICATION

The present application claims priority under 35 USC §119(e) to U.S. Provisional Application No. 61/257,398, filed Nov. 2, 2009, the disclosure of which is incorporated herein by reference in its entirety.

TECHNICAL FIELD

The following disclosure relates generally to devices, systems and methods for adjusting tension in seat belt webs and other restraint system webs.

BACKGROUND

Various types of seat belt systems are known for restraining an occupant in an automobile, aircraft, or other vehicle. Conventional seat belt systems for cars, trucks and other road vehicles typically include an elongate web forming a lap belt and a shoulder belt. The web typically carries a connector that can slide between the lap and shoulder belts and be releasably attached to a buckle anchored to the floor of the vehicle on one side of the seat base. The opposite end of the shoulder belt typically passes through an upper D-ring or guide and then attaches to a retractor fixed to a sidewall of the vehicle on the opposite side of the seat. The opposite end of the lap belt is typically anchored to the floor of the vehicle across from the buckle.

The retractor can include a spring-loaded reel or spool that retracts the web and takes up slack in the shoulder and lap belts once they have been attached to the buckle. Although conventional retractors allow the web to pay out as the seat occupant moves around, because they are spring-loaded they still maintain a certain amount of tension in, for example, the shoulder belt during use. This tension results in pressure on the neck and/or chest of the occupant that may cause some discomfort, especially during long trips.

BRIEF DESCRIPTION OF THE DRAWINGS

FIG. 5A-5D are a series of top, end cross-sectional, side cross-sectional, and side views, respectively, of the web clamping device of FIGS. 1 and 2.

DETAILED DESCRIPTION

The present disclosure is directed generally to apparatuses, devices and associated methods for adjusting the tension in a seat belt web extending around an occupant in a vehicle, such as a land vehicle (e.g. cars, trucks, etc.), an air vehicle (e.g. airplanes, helicopters, etc.), and the like. For example, a web clamping device configured in accordance with one embodiment of the disclosure can be temporarily clamped to a shoulder web adjacent to the upper guide to prevent the retractor from pulling the web through the guide beyond the device. Preventing retraction of the shoulder web beyond a certain point can provide some slack in the shoulder web and reduce the pressure of the shoulder web on the wearer's neck and/or chest.

Several details describing structures and processes that are well-known and often associated with seat belt systems and other personal restraint systems are not set forth in the following description to avoid unnecessarily obscuring embodiments of the disclosure. Moreover, although the following disclosure sets forth several embodiments of the invention, other embodiments can have different configurations, arrangements, and/or components than those described herein without departing from the spirit or scope of the present disclosure. For example, other embodiments may have additional elements, or they may lack one or more of the elements described below with reference to FIGS. 1-8C.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 110 is first introduced and discussed with reference to FIG. 1.

Figure 1:
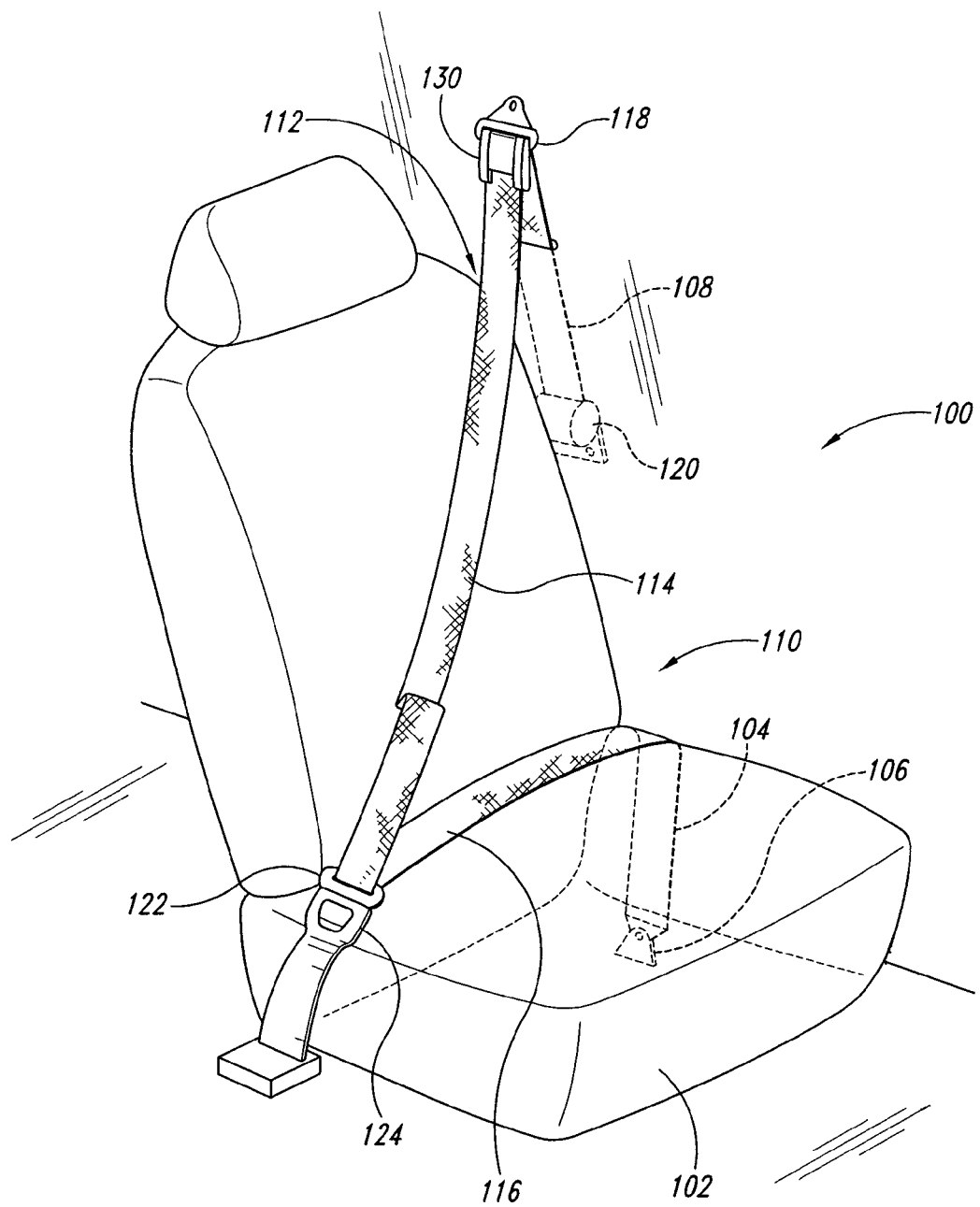
FIG. 1 is an isometric view of a seating area of a vehicle having a personal restraint system with a web clamping device configured in accordance with an embodiment of the disclosure.

FIG. 1 is an isometric view of a personal restraint system 110 having a web clamping device or web clip 130 configured in accordance with an embodiment of the disclosure. In the illustrated embodiment, the personal restraint system 110 can be a conventional seat belt system as used with an occupant seat 102 in a seating area 100 of a vehicle. The vehicle can be a car, truck, or other land vehicle, as well as an aircraft, watercraft, etc.

In the illustrated embodiment the personal restraint system 110 includes an elongate and flexible web 112 (e.g., a conventional seat belt web) having a first end portion 104 fixedly attached to an anchor 106 on a floor of the vehicle adjacent a base of the seat 102, and a second end portion 108 wound onto a web retractor 120 fixedly attached to a sidewall of the vehicle adjacent a back of the seat 102. A belt connector 122 is slidably coupled to the web 112 and divides the web into a lap web portion 116 and a shoulder web portion 114. The belt connector 122 includes a tongue (e.g., a metal tongue; not shown) that releasably engages a buckle 124 anchored to the floor of the vehicle opposite the anchor 106. The buckle 124 can be a conventional seat belt buckle having a button or other actuator for releasing the belt connector 122 when the occupant wishes to depart the vehicle. The shoulder web portion 114 slideably passes through a D-ring or guide 118 before extending downward into the web retractor 120. In the illustrated embodiment, the web retractor 120 can be a conventional web retractor having a spring-loaded reel or spool that winds the web 112 into the retractor 120 and maintains tension on the web when it is buckled around an occupant.

Although a seat occupant is not shown in FIG. 1, those of ordinary skill in the art will understand that the personal restraint system 110 can be used in the conventional manner to restrain an occupant in the seat 102 in the event of a rapid deceleration event, such as an accident. More specifically, to use the restraint system 110 a person sits in the seat 102, draws the lap web portion 116 and the shoulder web portion 114 across him- or herself, and attaches the belt connector 122 to the buckle 124. To adjust the tension in the web 112, the occupant pulls a small amount of the shoulder web portion 114 out of the retractor 120, and slides the web clip 130 up the shoulder web portion 114 toward the guide 118. The occupant then clamps the web clip 130 to the shoulder web portion 114 adjacent to the guide 118. When the occupant releases the shoulder web portion 114, the web clip 130 comes to bear against the guide 118 and prevents the web 112 from being retracted further into the web retractor 120. By attaching the web clip 130 to the shoulder web portion 112 in this manner, the occupant can adjust the slack and/or tension in the web 112, and thereby reduce the pressure exerted against his or her body by the shoulder web portion 114 and/or the lap web portion 116.

Figure 2:
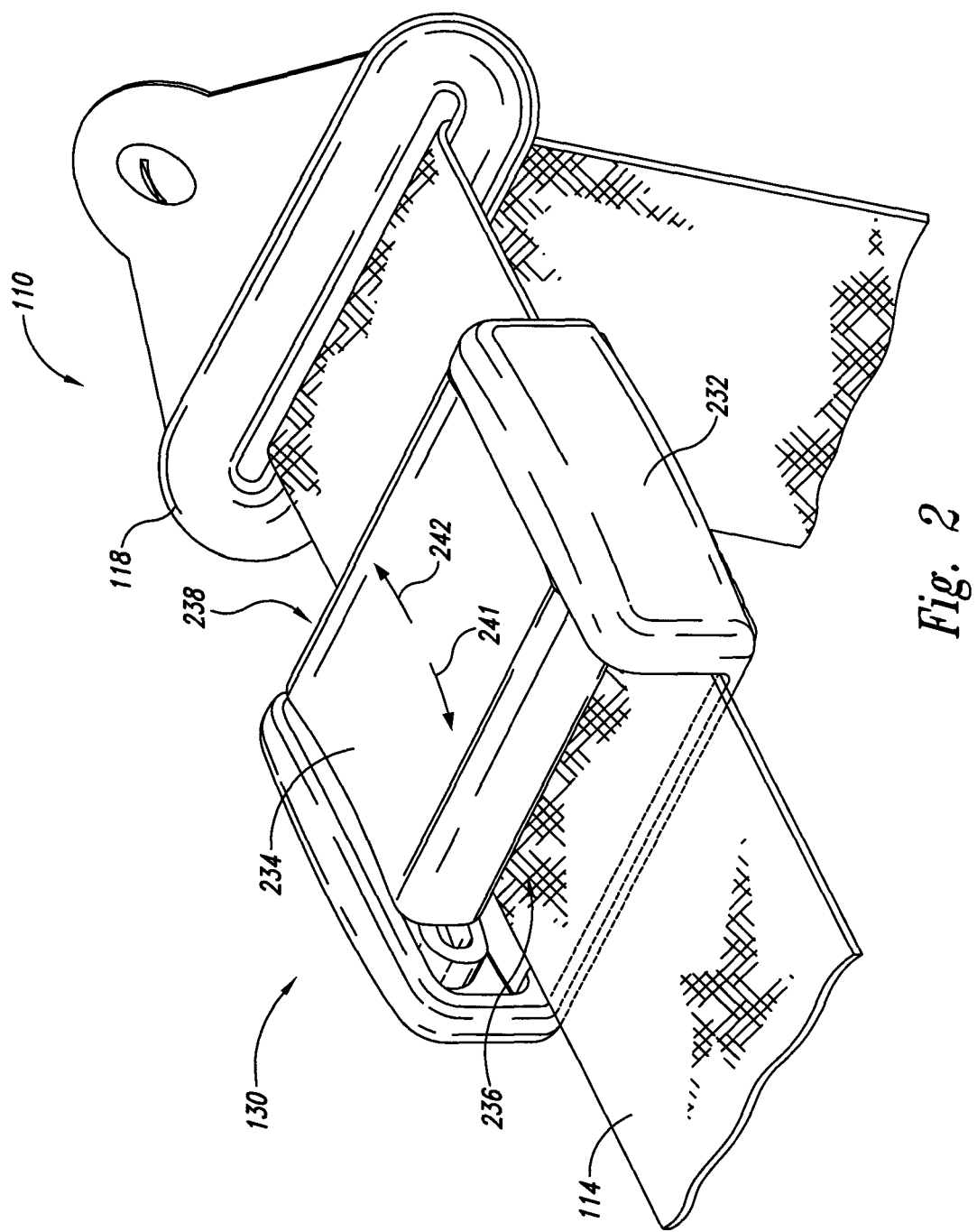
FIG. 2 is an enlarged isometric view of a portion of the personal restraint system of FIG. 1 illustrating various aspects of the web clamping device in more detail.

FIG. 2 is an enlarged isometric view of a portion of the occupant restraint system 110 illustrating various aspects of the web clip 130 in more detail. In the illustrated embodiment, the web clip 130 includes an actuator or button 234 operably coupled to a housing 232. In the illustrated embodiment, the button 234 and/or the housing 232 can be manufactured from various types of suitable materials known in the art including injection-molded plastics, metals (e.g., metal castings), Delrin®, etc., as well as other materials known in the art having suitable stiffness, strength, manufacturing, and/or cost characteristics.

In one aspect of this embodiment, the shoulder web portion 114 extends through a first opening 236 and a second opening 238 formed between the button 234 and the housing 232. As described in greater detail below, the seat occupant can move the button 234 in a first direction 241 away from the position shown in FIG. 2 to clamp the web clip 130 to the shoulder web portion 114 in a desired position. When the occupant releases the shoulder web portion 114, the web retracts until the clamping device 130 butts against the guide 118 and restricts further retraction of the shoulder web portion 114 into the web retractor 120 (FIG. 1). To release the web clip 130, the occupant simply moves the button 234 back in a second direction 242 toward the position shown in FIG. 2. The web clip 130 can then be slid up and down the shoulder web portion 114 as desired. Note that, in the illustrated embodiment, the web clip 130 can be oriented in either direction on the shoulder web portion 114. That is, the web clip 130 can be oriented with the second opening 238 facing the guide 118 as shown in FIG. 2, or in the opposite orientation with the first opening 236 facing the guide 118.

Figure 3A:
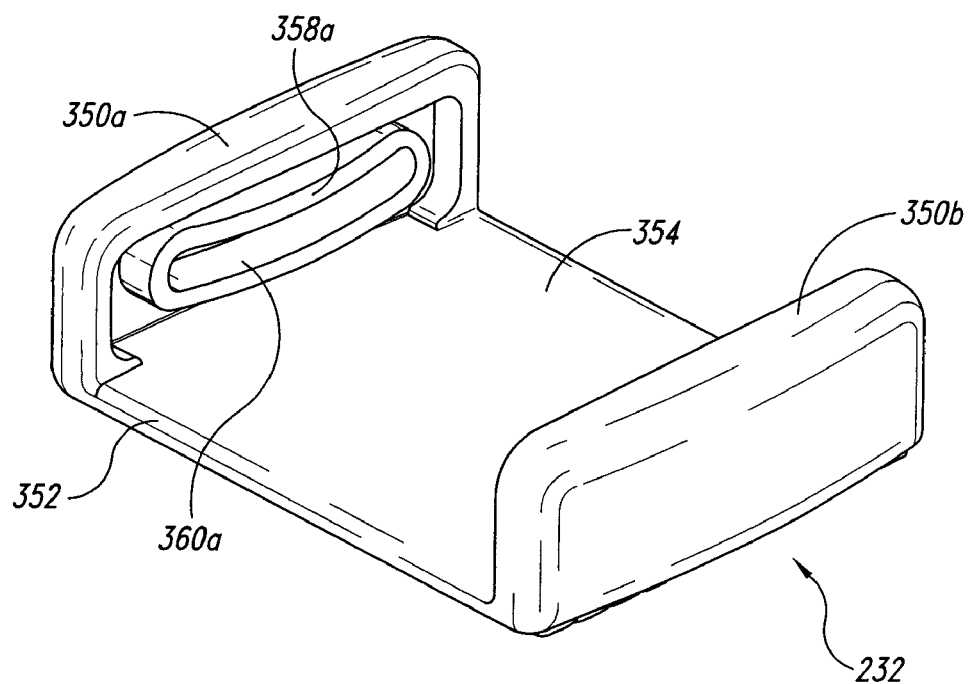
FIGS. 3A and 3B are top and bottom isometric views, respectively, of a web clamping device housing configured in accordance with an embodiment of the disclosure.
Figure 3B:
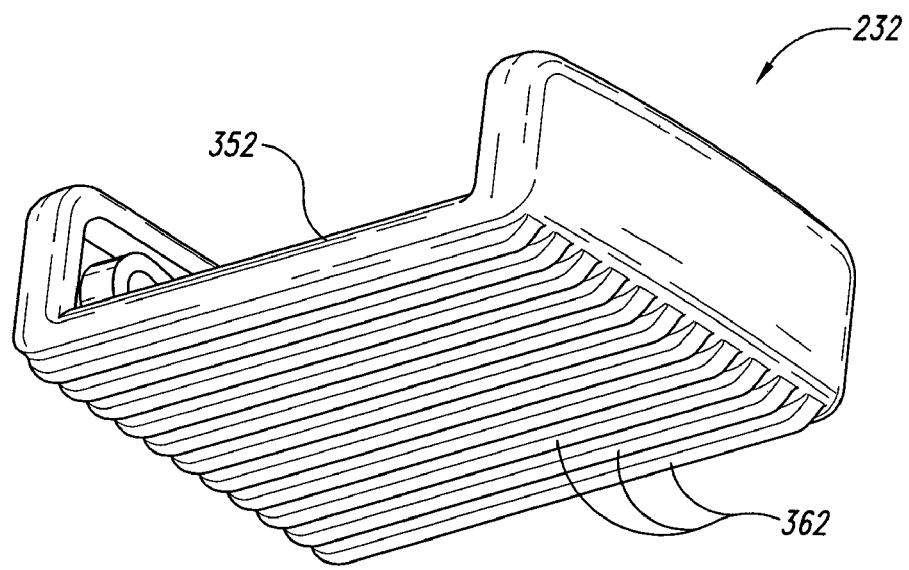

FIGS. 3A and 3B are top isometric and bottom isometric views, respectively, of the housing 232 configured in accordance with an embodiment of the disclosure. Referring first to FIG. 3A, the housing 232 includes first and second opposing sidewalls 350a and 350b, respectively, extending upwardly from a base 352. The sidewalls 350 can be mirror-images of each other, and each includes a guide portion 358 (identified individually as a first guide portion 358a and a second guide portion 358b (not visible in FIG. 3A)). In the illustrated embodiment, each guide portion 358 includes a corresponding recess or slot 360 (identified individually as a first slot 360a and a second slot 360b (not visible in FIG. 3A)). As described in greater detail below, the slots 360 are configured to slideably receive and support corresponding guide features extending outwardly from the button 234 (FIG. 2). The base 352 includes an inner surface or first clamping surface 354 positioned between the upstanding sidewalls 350. As shown in FIG. 3B, the underside of the base 352 can include a plurality of transverse ribs 362 that stiffen the housing 232.

Figure 4:
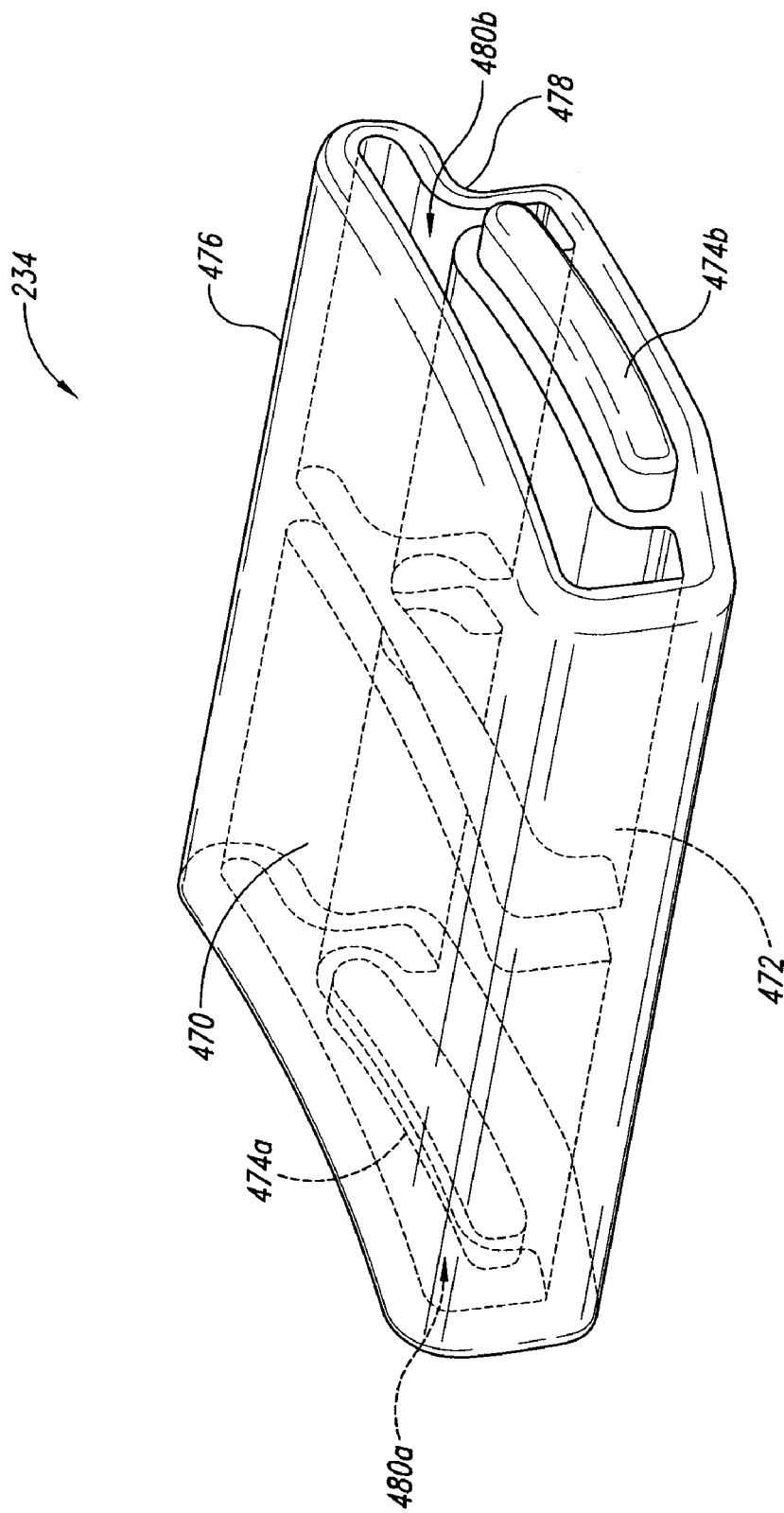
FIG. 4 is an enlarged isometric view of a web clamping device actuator configured in accordance with an embodiment of the disclosure.

FIG. 4 is an enlarged isometric view of the button 234 configured in accordance with an embodiment of the disclosure. In the illustrated embodiment, the button 234 includes an upper manipulating surface 470 and a lower cam surface 472. Guide features or protrusions 474 (identified individually as a first protrusion 474a and an opposite second protrusion 474b) extend outwardly from each side of the button 234. As described in greater detail below, the protrusions 474 have curved and elongate shapes that enable them to slide in the corresponding slots 360 (FIG. 3A) and maintain proper orientation of the button 234 relative to the housing 232. The button 234 can further include first and second cavities 480 (identified individually as a first cavity 480a and a second cavity 480b) which extend at least partially around the corresponding protrusions 474. In the illustrated embodiment, a front edge portion 476 of the button 234 can include a recess or lip 478 to facilitate gripping and/or manipulation of the button 234 by the seat occupant or other user during operation of the web clip 130 (FIG. 2).

FIG. 5A is a top view of the web clip 130, FIG. 5B is a cross-sectional end view taken along line 5B-5B in FIG. 5A, FIG. 5C is a cross-sectional side view taken along line 5C-5C in FIG. 5A, and FIG. 5D is a side view of the clamping device 130. Referring to FIGS. 5A-5C together, each button protrusion 474 is slideably received in a corresponding slot 360 in the guide portion 358 of each side wall 350. As shown to good effect in FIG. 5C, each of the slots 360 is elongate with a slight radius of curvature. For example, in one embodiment the slots 360 can have a radius of curvature R of from about 1 inch to about 7 inches, or about 2.5 inches. Similarly, in the illustrated embodiment each of the protrusions 474 has an equivalent, or an at least approximately equivalent, radius of curvature R as the corresponding slot 360.

In the illustrated embodiment, however, the protrusions 474 are not as long as the corresponding slots 360. This enables the protrusions 474 to slide in the slots 360 as the button 234 moves in the first direction 241 away from the position shown in FIG. 5A, and as the button 234 moves back in the second direction 242 toward the position shown in FIG. 5A. In other embodiments, the slots 360 and/or the protrusions 474 can have other suitable shapes and sizes. For example, in other embodiments the slots can be in the button 234 and the protrusions can extend into the slots from the sidewalls of the housing 232. In still other embodiments, the button 234 and/or the housing 232 can include other guide features and/or guide portions without departing from the spirit or scope of the present disclosure. Accordingly, the present disclosure is not limited to the particular types of guide features and guide portions shown, but extends to other suitable and/or equivalent features that provide the web clamping function described herein.

When the button 234 is moved in the second direction 242, the protrusions 474 come to bear against a first end portion 534 of the slots 360, as shown in FIG. 5C. When the button 234 is in this position, a gap G is formed between a slight crown 590 of the cam surface 472 and the clamping surface 354 of the housing 232, as shown in FIGS. 5B and 5D. In this "unlocked" position, the gap G is sufficiently large to allow the shoulder web portion 114 (not shown in FIGS. 5A-5D) to slide fore and aft between the button 234 and the housing 232 with a slight frictional resistance. Conversely, when the button 234 is moved in the first direction 241, the protrusions 474 come to bear against, or at least approach, a second end portion 532 of the slots 360 (FIG. 5C). When the button 234 moves toward this "locked" position, the gap G closes or reduces to the point that the cam surface 472 and the clamping surface 354 compress and grip the shoulder web portion 114 therebetween, clamping the web clip 130 to the shoulder web portion 114 and preventing the retractor 120 (FIG. 1) from pulling the shoulder web portion 114 through the web clip 130. Friction in the system holds the button 234 in the locked position and keeps the web clip 130 clamped onto the shoulder web portion 114, until the button 234 is manually moved in the second direction 242 toward the position shown in FIG. 5A.

Accordingly, in the illustrated embodiment the web clip 130 clamps onto the web 112 when the button 234 is moved away from the position shown in FIGS. 5A-5D in the first direction 241. This prevents the web 112 from being pulled further into the retractor 120 (FIG. 1) because the web clip 130 is larger than the slot in the guide 118 through which the shoulder web portion 114 passes. This provides the seat occupant with a way to adjust the tension in the shoulder web portion 114 and/or the lap web portion 116 by clamping the device 130 to the web 112 in a desired location and preventing the web from being fully retracted into the retractor 120. When the occupant desires to release the web clip 130, he or she simply grasps the button 234 and moves it in the second direction 242 to increase the gap G between the cam surface 472 and the clamping surface 354, thereby allowing the clamping device 130 to be slid up or down the shoulder web portion 114 as desired.

Figure 6:
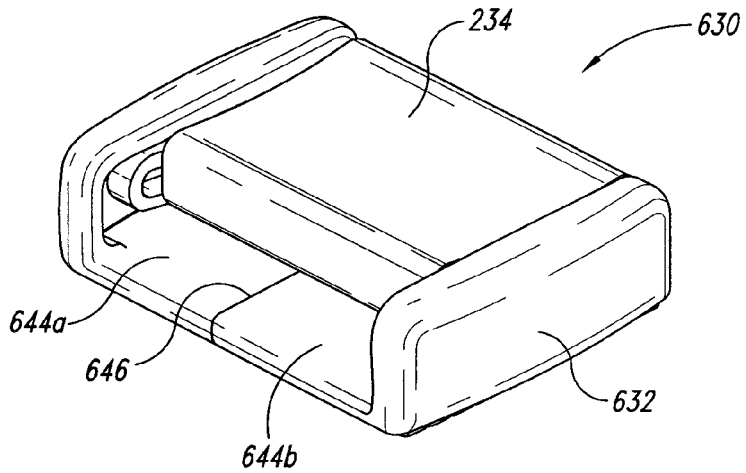
FIG. 6 is an isometric view of a web clamping device having a 2-piece housing configured in accordance with another embodiment of the disclosure.

FIG. 6 is an isometric view of a seat belt web clamping device or web clip 630 having a two piece housing 632 configured in accordance with another embodiment of the disclosure. Many features of the web clip 630 are at least generally similar in structure and function to the web clip 130 described in detail above with reference FIGS. 1-5D. As described in greater detail below with reference to FIGS. 7A-8C, however, the housing 632 includes a first housing portion 644a that is snapped or otherwise joined together with a second housing portion 644b to form the housing 632.

Figure 7A:
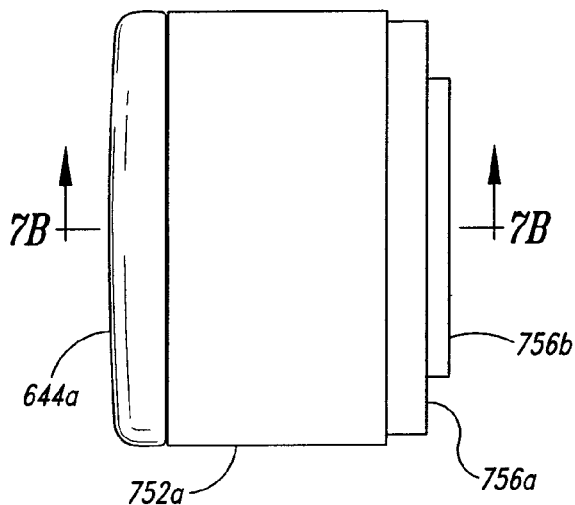
FIGS. 7A-7C are a series of top, end cross-sectional, and side views, respectively, of a first portion of the web clamping device housing of FIG. 6.
Figure 7B:
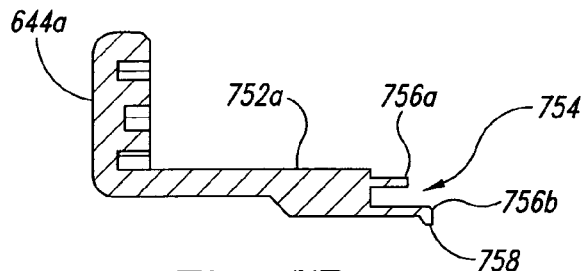
Figure 7C:
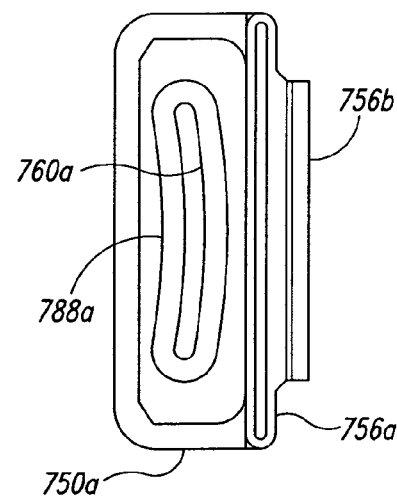

FIGS. 7A-7C are a series of top, end cross-sectional, and inboard side views, respectively, of the first housing portion 644a configured in accordance with an embodiment of the disclosure. Referring to FIG. 7A-7C together, the first housing portion 644a includes a first sidewall 750a extending upwardly from a base portion 752a. The first sidewall 750a can include a first guide portion 788a and a corresponding first guide slot 760a that are least generally similar in structure and function to the first guide portion 358a and the first slot 360a described in detail above with reference to FIG. 3A.

In another aspect of this embodiment, the first housing portion 644a includes a first coupling feature 754a for joining the first housing portion 644a to the second housing portion 644b. In the illustrated embodiment, the first coupling feature 754a includes a first insert 756a and a second insert 756b. In the illustrated embodiment, the first and second inserts 756 are at least generally rectangular and/or planer protrusions that extend outwardly from the first base portion 752a. In this particular embodiment, however, the first insert 756a is wider than the second insert 756b, and the second insert 756b protrudes further outward than the first insert 756a. The second insert 756b also includes an engagement portion or lip 758 that extends downwardly from the outboard edge portion of the second insert 756b. In other embodiments, housing portions configured in accordance with the present disclosure can include other types of coupling features having other shapes and sizes.

Figure 8A:
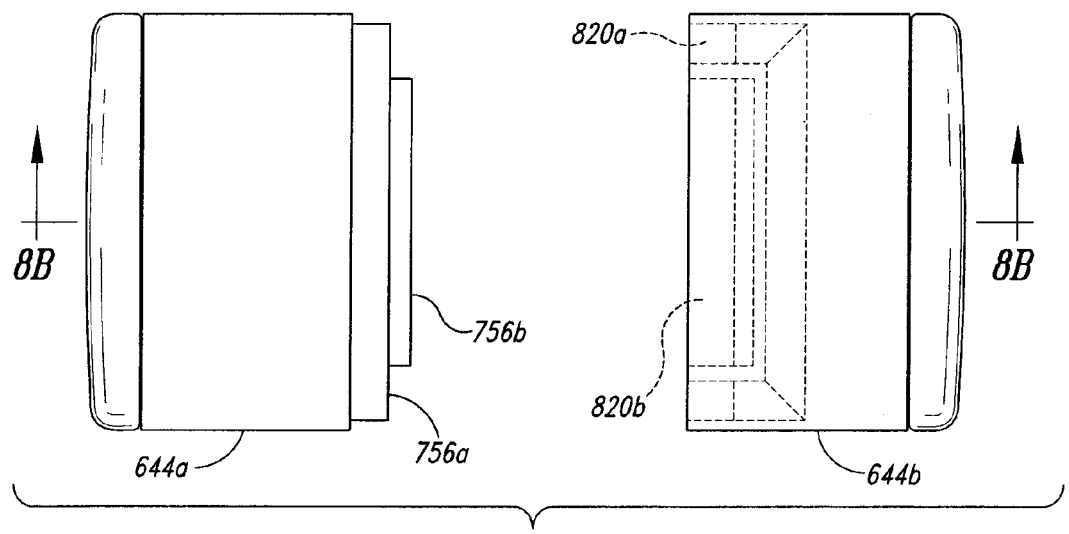
FIGS. 8A and 8B are exploded top and end cross-sectional views, respectively, of the web clamping device housing of FIG. 6.
Figure 8B:
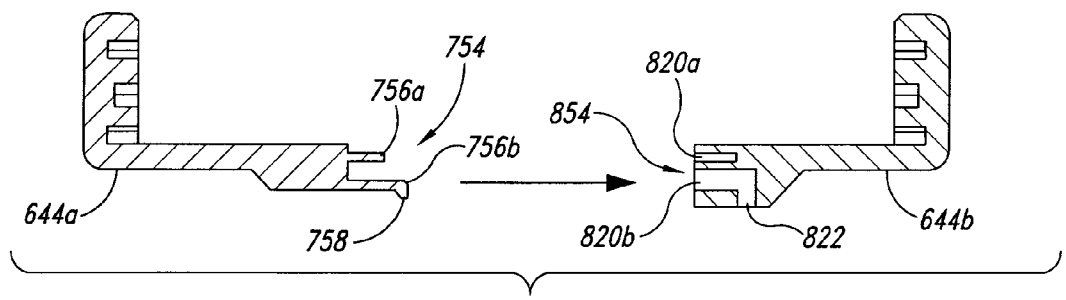
Figure 8C:
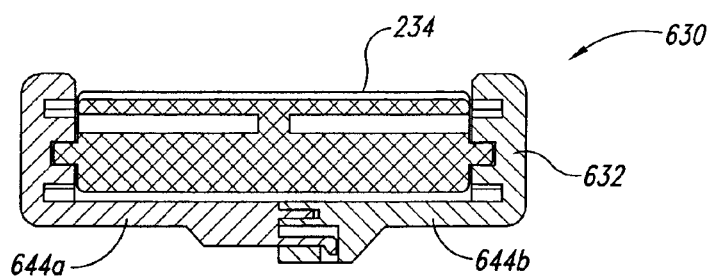
FIG. 8C is an end cross-sectional view of the web clamping device of FIG. 6 after it has been assembled together in accordance with an embodiment of the disclosure.

FIGS. 8A and 8B are exploded top and cross-sectional end views, respectively, of the first housing portion 644a and the second housing portion 644b prior to assembly, and FIG. 8C is a cross-sectional end view of the clamping device 630 after the first housing portion 644a has been snapped together or otherwise attached to the second housing portion 644b. Referring to 8A and 8B together, the second housing portion 644b includes a second coupling feature 854 configured to receive the first coupling feature 754 of the first housing portion 644a. In the illustrated embodiment, the second coupling feature 854 includes a first recess or cavity 820a configured to receive the first insert 756a, and a second recess or cavity 820b configured to receive the second insert 756b. Moreover, the second cavity 820b includes a corresponding notch 822 positioned toward a proximal end portion of the cavity 820b. The notch 822 is configured to receive and engage the lip 758 on the distal end portion of the second insert 756b when the first housing portion 644a is joined to the second housing portion 644b as shown in FIG. 8C.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A web clip for adjusting the tension in a seat belt web, the web clip comprising:
    a housing having a base with a clamping surface, wherein the housing includes first and second sidewalls extending upwardly from opposite sides of the base, wherein the first sidewall includes a first curved slot and the second sidewall includes a second curved slot; and
    an actuator movably coupled to the housing, the actuator having a cam surface opposing the clamping surface to define a gap therebetween configured to accommodate a seat belt web extending therethrough, wherein movement of the actuator in a first direction reduces the gap causing the web clip to grip the seat belt web between the cam surface and the clamping surface, and wherein movement of the actuator in a second direction opposite to the first direction increases the gap and allows the seat belt web to slide between the cam surface and the clamping surface, wherein the actuator includes first and second protrusions extending outwardly therefrom, wherein the first and second curved slots have a first radius of curvature and the first and second protrusions have a complementary second radius of curvature, and wherein the first protrusion is slidably received in the first curved slot and the second protrusion is slidably received in the second curved slot to constrain the actuator to back and forth movement along an arc relative to the housing; and wherein the cam surface includes a crown that defines the gap between the cam surface and the clamping surface.

2. The web clip of claim 1 wherein the actuator is slidably coupled to the housing between the first and second sidewalls.

3. The web clip of claim 1 wherein the actuator includes the first and second protrusions at opposing sides thereof.

4. The web clip of claim 1 wherein the actuator is constrained to move back and forth in the first and second directions generally parallel to the clamping surface.

5. The web clip of claim 1 wherein the housing includes:
a first housing portion, the first housing portion having an insert extending outwardly from a first base portion; and
a second housing portion, the second housing portion having a cavity in a second base portion, wherein cavity receives the insert to fixedly couple the first housing portion to the second housing portion.

6. The web clip of claim 1 wherein each of the first and second curved slots each has a first end potion and a second end portion, and wherein each of the first and second curved slots are curved between the first and second end portions.

7. A personal restraint system for use with an occupant seat in a vehicle, the personal restraint system comprising:
an anchor fixedly attached to a first portion of the vehicle adjacent a base of the occupant seat;
a web retractor fixedly attached to a second portion of the vehicle adjacent a back of the occupant seat;
an elongate web having a first end portion fixedly attached to the anchor and a second end portion wound onto the web retractor;
a belt connector slidably coupled to the web and dividing the web into a lap web portion and a shoulder web portion;
a web guide fixedly attached to a third portion of the vehicle adjacent an upper back of the occupant seat, wherein the shoulder web portion extends through the web guide before entering the web retractor; and
a web clip operably coupled to the shoulder web portion, the web clip including:
a housing having a base with a clamping surface, wherein the housing includes first and second sidewalls extending upwardly from opposite sides of the base, wherein the first sidewall includes a first curved slot and the second sidewall includes a second curved slot; and
an actuator movably coupled to the housing, the actuator having a cam surface opposing the clamping surface to define an opening therebetween that accommodates the shoulder web portion, wherein the actuator includes first and second protrusions extending outwardly therefrom, wherein the first and second curved slots have a first radius of curvature and the first and second protrusions have a complementary second radius of curvature, and wherein the first protrusion is slidably received in the first curved slot and the second protrusion is slidably received in the second curved slot to constrain the actuator to back and forth movement along an arc relative to the housing, wherein movement of the actuator in a first direction clamps the shoulder web portion between the cam surface and the clamping surface, and wherein movement of the actuator in a second direction opposite to the first direction releases the shoulder web portion and allows the shoulder web portion to slide between the cam surface and the clamping surface, and wherein the web clip can be selectively clamped to the shoulder web portion to prevent the shoulder web portion from further retraction into the web retractor.

8. The personal restraint system of claim 7, wherein movement of the actuator in the first direction reduces the opening causing the web clip to grip the shoulder web portion between the cam surface and the clamping surface, and wherein movement of the actuator in the second direction increases the opening and allows the shoulder web portion to slide between the cam surface and the clamping surface.

9. The personal restraint system of claim 7 wherein the web clip housing includes a first housing portion and a second housing portion, and wherein the web clip further includes means for snapping the first and second housing portions together to form the housing.

10. The personal restraint system of claim 7 wherein the web clip is separate from the web guide and independently movable along the shoulder web relative to the web guide.

11. A method of assembling a personal restraint system for use with an occupant seat in a vehicle, the method comprising:
fixedly attaching a first end portion of an elongate seat belt web to a first portion of the vehicle adjacent a base of the occupant seat;
extending the web through a web guide fixedly attached to a second portion of the vehicle adjacent an upper back of the occupant seat;
winding a second end portion of the web around a web retractor fixedly attached to a third portion of the vehicle below the web guide; and
operably coupling a web clip to the web adjacent the web guide, the web clip including:
a housing having a base with a clamping surface positioned adjacent a first side surface of the web, wherein the housing includes first and second sidewalls extending upwardly from opposite sides of the base, wherein the first sidewall includes a first curved slot and the second sidewall includes a second curved slot; and
an actuator movably coupled to the housing, the actuator having a cam surface positioned adjacent a second side surface of the web, wherein the actuator includes first and second protrusions extending outwardly therefrom, wherein the first and second curved slots have a first radius of curvature and the first and second protrusions have a complementary second radius of curvature, and wherein the first protrusion is slidably received in the first curved slot and the second protrusion is slidably received in the second curved slot to constrain the actuator to back and forth movement along an arc relative to the housing; and
wherein movement of the actuator in a first direction moves the cam surface generally toward the clamping surface and squeezes the web between the cam surface and the clamping surface, and wherein movement of the actuator in a second direction opposite to the first direction moves the cam surface generally away from the clamping surface and allows the web to move between the cam surface and the clamping surface.

12. The method of claim 11, further comprising:
fixedly attaching a seat belt buckle to a fourth portion of the vehicle adjacent the base of the occupant seat and across from the first portion of the vehicle; and
slidably coupling a belt connector to the web, wherein the belt connector is configured to be releasably engaged with the seat belt buckle, and wherein the web clip is operably coupled to the web between the belt connector and the web guide.

* * * * *

UNITED STATES PATENT AND TRADEMARK OFFICE
CERTIFICATE OF CORRECTION

Page 1 of 1

PATENT NO. : 8,393,645 B2
APPLICATION NO. : 12/917898
DATED : March 12, 2013
INVENTOR(S) : Michael A. Wiseman et al.

It is certified that error appears in the above-identified patent and that said Letters Patent is hereby corrected as shown below:

On Title Page, Item (56), under "Other Publications", column 2, line 1, delete "Toltsman." and insert -- Toltzman. --, therefor.

In the Specifications:

In column 1, line 62, delete "FIG." and insert -- FIGS. --, therefor.

Signed and Sealed this
Sixth Day of August, 2013

Teresa Stanek Rea
*Acting Director of the United States Patent and Trademark Office*